United States Patent
Cherdron et al.

(10) Patent No.: US 7,600,215 B2
(45) Date of Patent: *Oct. 6, 2009

(54) USING INTERRELATED DATA AT RUN TIME

(75) Inventors: Markus Cherdron, Muehlhausen (DE); Uwe Reeder, Riegelsberg (DE); Stephan Ritter, Saarbroecken (DE); Frank Weigel, Saarbroecken (DE)

(73) Assignee: SAP AG, Walldorf (DE)

(*) Notice: Subject to any disclaimer, the term of this patent is extended or adjusted under 35 U.S.C. 154(b) by 581 days.

This patent is subject to a terminal disclaimer.

(21) Appl. No.: 10/676,837

(22) Filed: Sep. 30, 2003

(65) Prior Publication Data

US 2004/0133898 A1 Jul. 8, 2004

Related U.S. Application Data

(60) Provisional application No. 60/414,985, filed on Sep. 30, 2002.

(30) Foreign Application Priority Data

Oct. 31, 2002 (EP) .................... 02024242

(51) Int. Cl.
*G06F 9/44* (2006.01)
*G06F 3/00* (2006.01)
*G06F 3/048* (2006.01)
*G06F 17/30* (2006.01)

(52) U.S. Cl. .............. 717/105; 717/109; 717/111; 717/113; 717/121; 715/744; 715/763; 707/4

(58) Field of Classification Search .......... 717/104; 715/744

See application file for complete search history.

(56) References Cited

U.S. PATENT DOCUMENTS

| 6,496,202 | B1 * | 12/2002 | Prinzing | 715/762 |
| 6,664,978 | B1 * | 12/2003 | Kekic et al. | 715/733 |
| 6,952,620 | B2 * | 10/2005 | Cherdron et al. | 700/30 |

(Continued)

FOREIGN PATENT DOCUMENTS

EP 0996058 A1 4/2000

OTHER PUBLICATIONS

Althammer, E. et al., "Design and Implementation of a MVC-Based Architecture for E-Commerce Applications," *International Journal of Computers & Applications*, Acta Press, pp. 1-22, 2001.
Krasner G. E. et al., "A Cookbook for Using the Model-View-Controller User Interface Paradigm in Smalltalk-80," *JOOP*, vol. 1, No. 3, pp. 26-49, Aug. 1988.

(Continued)

*Primary Examiner*—Tuan Q Dam
*Assistant Examiner*—Isaac T Tecklu
(74) *Attorney, Agent, or Firm*—Finnegan, Henderson, Farabow, Garrett & Dunner, LLP (57) ABSTRACT

Methods, systems and computer program products implementing techniques for using interrelated data at run time. The techniques include establishing a model, the model implementing application logic of an application; establishing at least one view for presenting the model; establishing at least one controller for manipulating the model; and establishing at least one storage area, the storage area relating to the controller and storing an instance of a first data structure, the instance of the first data structure comprising application data having been stored in the storage area by an access method, the first data structure having been declared prior to execution of the application.

16 Claims, 9 Drawing Sheets

U.S. PATENT DOCUMENTS

| | | | |
|---|---|---|---|
| 2001/0020255 A1* | 9/2001 | Hofmann et al. | 709/318 |
| 2002/0184610 A1* | 12/2002 | Chong et al. | 717/109 |
| 2003/0023953 A1* | 1/2003 | Lucassen et al. | 717/106 |
| 2003/0197726 A1* | 10/2003 | Weitzman | 345/744 |
| 2003/0226111 A1* | 12/2003 | Wirts et al. | 715/514 |

OTHER PUBLICATIONS

Anonymous: "Freedom for Developers," Internet Article, Oct. 12, 2002.

European Search Report dated Sep. 29, 2006 (4 pages).

* cited by examiner

USING INTERRELATED DATA AT RUN TIME

CROSS-REFERENCE TO RELATED APPLICATIONS

This application claims the benefit of U.S. Application Ser. No. 60/414,985, filed on Sep. 30, 2002, European Application Serial No. 02024242.6 filed on Oct. 31, 2002, and U.S. application Ser. No. 10/335,191, filed on Dec. 30, 2002.

BACKGROUND

The present invention relates to electronic data processing in general, and particularly to using interrelated data at run time.

In the model view controller (MVC) design pattern used for developing application programs, the model represents the core of such an application program. The model can have multiple views, where each view displays information about the model to a user. A controller of the model receives events, for example, raised by a user interacting with a view to manipulate the model. The model can have multiple controllers and a controller can relate to multiple views. The model and the controller typically include application code. When changes occur in the model, the model updates all of its views. Data binding is used for data transport between the view and its model or controller. For example, a table view can be defined to display data of a corresponding table that is stored in the model or controller. The table is used as the data source for the table view (data binding). For example, the table view can be replaced by a further view, such as a linked list, that binds against the same table. In this case, the further view displays the table data without changing anything in the controller or the model.

When building a software application, predefined relationships can exist between various data elements used by the application. Predefined relationships can be defined in a variety of ways; for example, the relationships can be defined through dependencies in a relational database. However, for some data, predefined relationships do not exist, for example, when no relationship is defined in a database or when it is data that refers to the model on the one hand and to the view on the other hand. Therefore, usually a major portion of the application's code is devoted to defining the corresponding relationships and to enabling the data transport, for example, from the model to the view.

Further, at a given point in time an application has a specific state that reflects the current status of the interaction of the user with the application (e.g., on which view is the cursor of the application and which row of a specific table in the view has been selected by the user). Typically, an application developer has to write application coding to memorize and administrate the state (e.g., by using state variables).

Further, when the user of a client-server system interacts with the client, typically the client sends a request to the server to rebuild a current page and the server sends the rebuilt page to the client. This may cause an unpleasant effect for the user in the form of a flickering picture on a display device of the client. Some client-server systems support mechanisms to rebuild only mandatory components of the page and send only the corresponding delta information to the client to reduce flickering. However, to determine the delta information, application-specific coding may have to be developed on both sides, the client and the server.

SUMMARY

The present invention provides methods, systems and computer program products implementing techniques for using interrelated data at run time.

In general, in one aspect, the techniques include establishing a model, the model implementing application logic of an application; establishing at least one view for presenting the model; establishing at least one controller for manipulating the model; and establishing at least one storage area, the storage area relating to the controller and storing an instance of a first data structure, the instance of the first data structure comprising application data having been stored in the storage area by an access method, the first data structure having been declared prior to execution of the application.

Implementations of the invention can include one or more of the following features.

The controller relates to the view, the view comprises a user interface (UI) element, and the UI element is bound to the first data structure. The instance of the first data structure comprises one or more node elements, each node element comprising one or more data fields based on the first data structure. One or more of the node elements are grouped into a node collection. One or more of the node elements in the node collection are grouped into a node selection. One of the node elements in the node selection is identified as a lead selection element. The controller relates to the view, the view comprises a UI element, the UI element is bound to the first data structure, and the UI element displays data from the lead selection element. The access method is part of an application programming interface (API) for accessing the instance of the first data structure.

The operations further comprise establishing an instance of a second data structure, the second data structure having been declared to be a child of the first data structure prior to execution of the application. The instance of the first data structure comprises one or more node elements of a first type grouped into a first node collection, and the instance of the second data structure comprises one or more node elements of a second type grouped into a second node collection. One of the node elements in the first node collection is identified as a selected element, and wherein the node elements in the second node collection depend on the selected element. The second node collection has a state. The state is selected from the group of valid, invalid, and unfilled.

The operations further comprise establishing a supply function for determining the content of the node elements in the second node collection when the state of the second node collection is invalid or unfilled. The supply function is implemented as a method of the controller.

In general, in another aspect, a technique for supplying data to a view presenting a model, the view having at least one user interface (UI) element and relating to a controller for manipulating the model, includes creating a run-time data structure in a storage area that relates to the controller, the run-time structure based on a design-time data structure, the design-time data structure including a structure element that is bound to the UI element; and using a supply function to provide content for the run-time data structure.

In general, in another aspect, a technique for accessing application data by an application using a model of the application and at least one controller for manipulating the model include providing a storage area that relates to the controller, the storage area being organized according to a design-time data structure having declared relationships between the application data, and storing a run-time data structure that is based on the design-time data structure; accessing a structure element of the run-time data structure, the structure element comprising a node collection; evaluating the node collection; and if the result of evaluating the node collection requires filling at least one element of the node collection then (1) sending a query to a computer system; and (2) in response to the query, receiving from the computer system at least one data instance that is used to fill the at least one element of the node collection.

The invention can be implemented to realize one or more of the following advantages. The techniques reduce the amount of storage that is needed to store an interaction status by eliminating redundant data storage.

The techniques improve data consistency within an application by eliminating the program code redundancy that originates from using multiple variables for the same data.

The techniques define the data relationships in a declarative way. Therefore, specific functions can be implemented without application-specific program code.

The techniques declare the data relationships generically. Therefore, the declared data relationships can be used by views that are developed using different technologies or formats, (e.g., PDF instead of HTML).

The details of one or more implementations of the invention are set forth in the accompanying drawings and the description below. Other features and advantages of the invention will be apparent from the description and drawings, and from the claims.

DETAILED DESCRIPTION

The present invention extends the MVC design pattern to include the concept of context. This will be referred to as an extended MVC design pattern.

Figure 1:
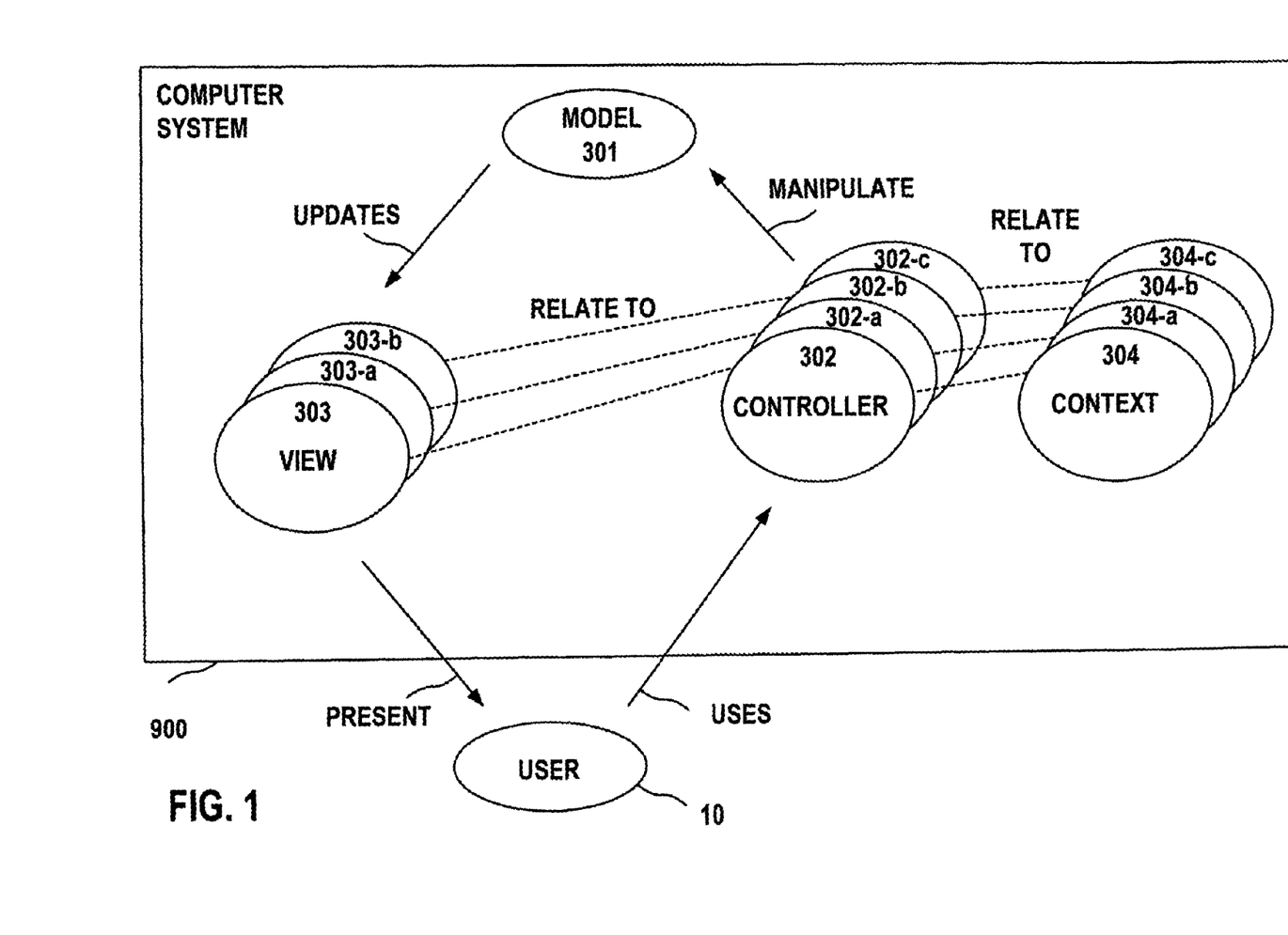
FIG. 1 is a simplified block diagram of a computer system that implements an embodiment of the extended MVC design pattern.

FIG. 1 is a simplified block diagram of a computer system 900 that implements an embodiment of the extended MVC design pattern. The extended MVC design pattern provides a context as a structured storage place for data that relates to a controller. A context instance 304 relates (dashed line) to a controller instance 302. Context instances and controller instances will be referred to as contexts and controllers, respectively. The controller 302 can manipulate a model 301 in response to an interaction of a user 10 with the computer system 900. There can be further controllers (e.g., further controllers 302-*a*, 302-*b*, 302-*c*) for manipulating the same model 301. The further controllers can have further contexts 304-*a*, 304-*b*, 304-*c* that relate (dashed lines) to the further controllers, respectively. The model 301 can have multiple views (e.g., views 303, 303-*a*, 303-*b*) that present the model to the user 10. When the model 301 gets modified by at least one of its controllers it updates all of its views. Each view relates (dashed lines) to a controller. There can be controllers (e.g., controller 302-*c*) that do not relate to any view. In one embodiment, a controller can relate to multiple views.

Figure 2:
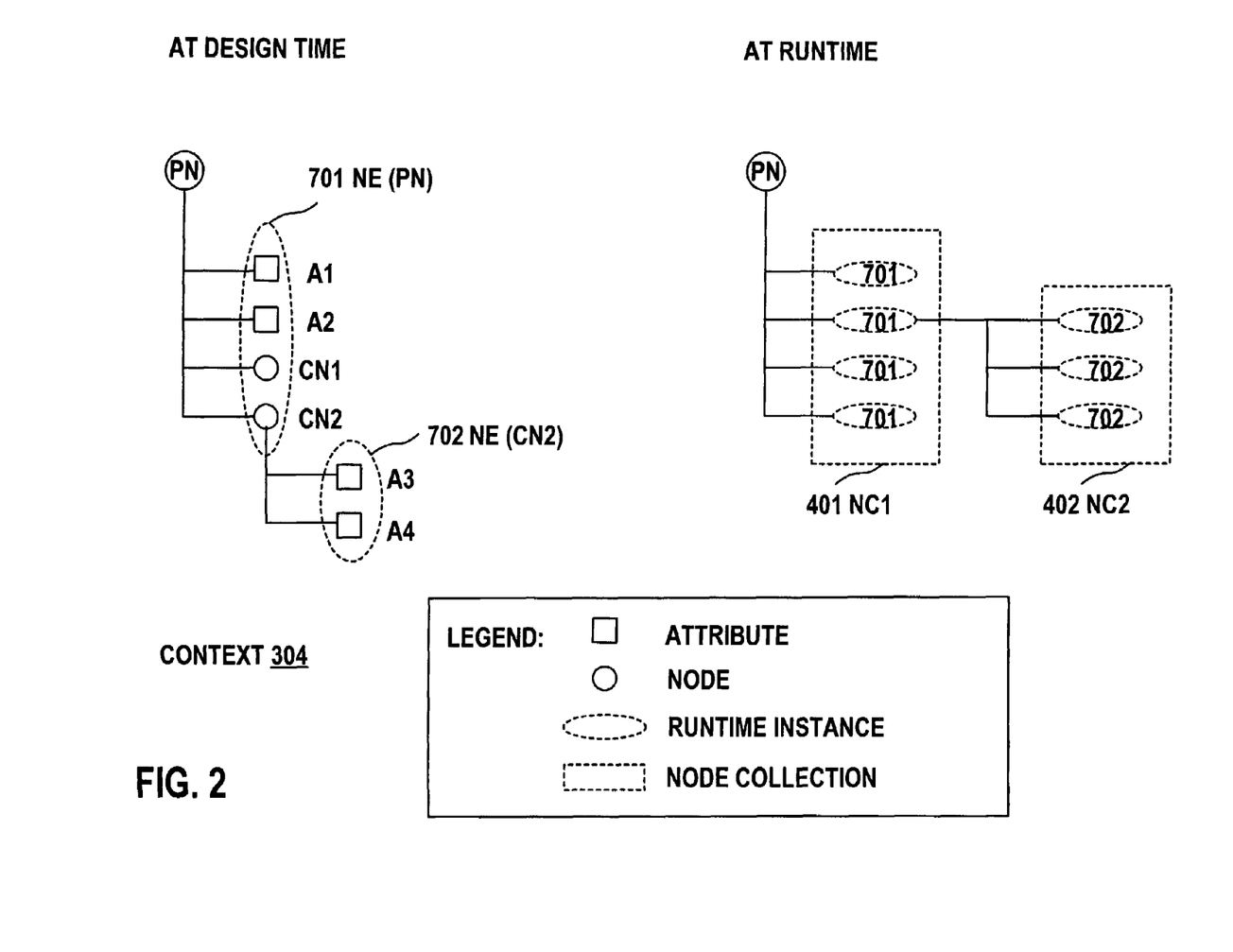
FIG. 2 illustrates an example of a structure of a context at design time and at runtime.

FIG. 2 illustrates an example of a structure of a context 304 at design time and at runtime. In general, structure elements of the design time context structure are different from structure elements of the runtime context structure.

An example of a design time context structure is a node hierarchy, wherein the structure elements of the node hierarchy can be nodes and attributes. The root-node of the node hierarchy represents the context itself. For example, the child nodes of the root node can be defined by the application. Child nodes of the root node will also be referred to as independent nodes. Child nodes of independent nodes depend on their corresponding parent node and will also be referred to as dependent nodes.

A node has a node type. Examples of node types are value nodes and model nodes. A value node can maintain, that is, store and administrate, its own application data (transient application data). The data can be, for example, scalar data, tables or structures. A model node includes a reference to application data that persists in a corresponding model.

The parent node can also have attributes. Each child node can include an arbitrary tree structure that includes further child nodes and/or attributes. Attributes are leaves in the tree structure. Attributes represent, for example, scalar data types, such as strings and integers or Java types (e.g., java.util.Date).

In the example of FIG. 2, at design time, the context 304 includes the independent node PN that includes the two attributes A1, A2 and that is the parent node of the dependent nodes CN1, CN2. The second dependent node CN2 has two further attributes A3, A4. This structure defines a first node element 701 for the parent node PN and a second node element 702 for the second child node CN2. The first node element 701 includes information about the context structure with regards to the parent node PN. In other words, it summarizes all information that is available at the context structure level that is under the level of the parent node PN. The second node element 702 includes information about the context structure with regards to the second dependent node CN2. The context structure implies that the second node element 702 depends on the first node element 701.

At runtime, structure elements (e.g., nodes) represent a set of data instances. Nodes provide type information about object instances that are maintained by the node. Each node can have a node collection, wherein each element of the node collection has the same node element type.

In the example of FIG. 2, at runtime, the parent node PN has a first node collection 401 that includes multiple runtime instances of the first node element 701. Each runtime instance of the first node element 701 can have a second node collection 402 of multiple runtime instances of the second node element 702. A node collection can be empty or has at least one instance of the corresponding node element.

A node collection has a cardinality and a node collection type, such as list, tree, set, or collection. The node collection cardinality (see table 2) and the node collection type (see table 1) can be declared at design time. An evaluation mechanism can be used to automatically evaluate the node collection of a child node at runtime when its parent node changes.

TABLE 1

Examples of node collection types

| Value | Meaning |
| --- | --- |
| Collection | forward-only iterator (cursor) without absolute positioning |
| Set | no duplicates, forward-only iterator without absolute positioning |
| List | duplicates allowed, position available, list iterator, absolute positioning (indexed access) |

The application can use the cardinality of a node collection to restrict possible operations on a node (e.g., prohibit indexed access to a node that has at most one node collection element).

TABLE 2

Examples of the cardinality of a node collection

| Value | Meaning |
| --- | --- |
| 0 . . . 1 | node collection can be empty, contains at most one element |
| 1 . . . 1 | node collection always contains exactly one element. |
| 0 . . . n | node collection can be empty or contain any number of elements |
| 1 . . . n | node collection always contains at least one element. |

The content of a node collection can be determined in various ways.

The node values of independent nodes can be set by initializers or event handlers or can be set through a supply function. The supply function is called when the node is accessed. To access a node, for example, the node is queried for its data by application code or by a user interface (UI) element (of the view) that is bound to the node.

Dependent nodes can get their values by using a supply function. For example, the node collection of a dependent node can become obsolete when a selection of its parent node changes. In this case the dependent node is recalculated, that is, the content of its node collection is determined on a subsequent access. In another example a representation instance is created for each dependent node of a parent node. The values of the representation instances are calculated when the corresponding parent node is accessed. In other words, using representation instances enables a "load data on demand" or a "unload data when not needed" mechanism. Therefore, memory is used in an efficient manner.

The content of a node collection can also be explicitly set to a state, such as "invalid" or "unfilled". When the node is accessed the next time, the node collection content is determined again. This can be used to force a re-read of modified data when the modification (e.g., in the model) was not visible to the application runtime.

Figure 3:
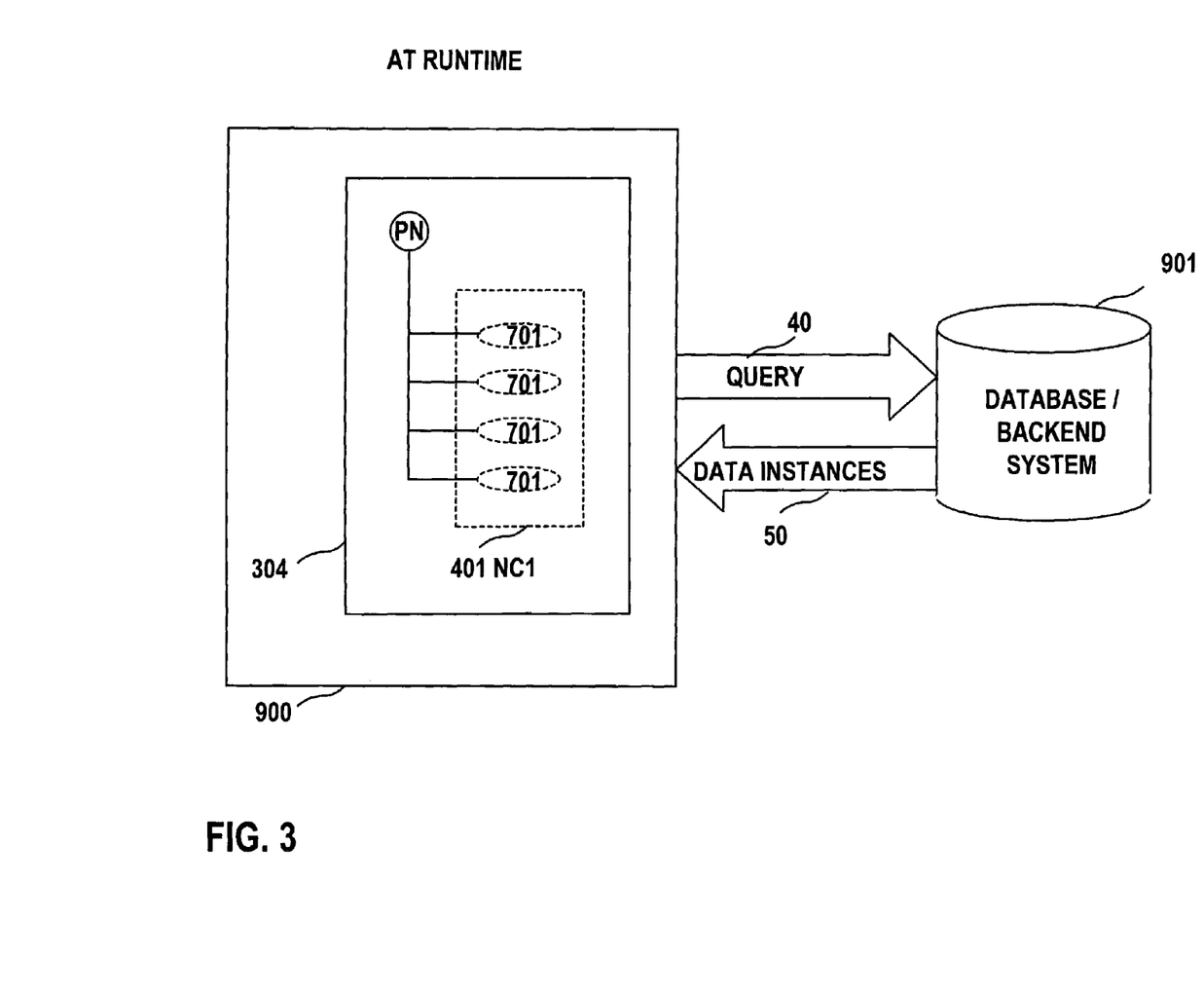
FIG. 3 illustrates the context at runtime as a set of data instances.

FIG. 3 illustrates the context 304 at runtime as a set of data instances. The nodes of the context 304 at runtime represent a system-managed set of data instances (e.g., a java.sql.RecordSet). For example, data instances are returned 50 from a database or backend system 901 in response to a query (e.g., a structured query language (SQL) query) that is sent 40 from the computer system 900 to the database/backend system 901 when a node is accessed, for example, by an application. Examples of backend systems are Enterprises Resource Planning systems, Customer Relationship Management systems, web server systems providing web services or any other system that stores application data. Accessing a node means requesting data from the corresponding model. This can result in a corresponding query request from the model to the database/backend system 901. Nodes provide type information about object instances that are maintained by the node. The type information can also be derived from the model. For example, if the parent node PN corresponds to a customer, its node collection 401 can include all orders for this customer. When the application accesses the parent node PN the computer system 900 can send 40 a query to retrieve all orders of the customer from the corresponding database/backend system 901, such as a sales and distribution (SD) system or a customer relationship management (CRM) system. The retrieved orders (data instances) are then returned 50 to the computer system 900 context 404 to fill the corresponding data of elements of the node collection 401.

Figure 4:
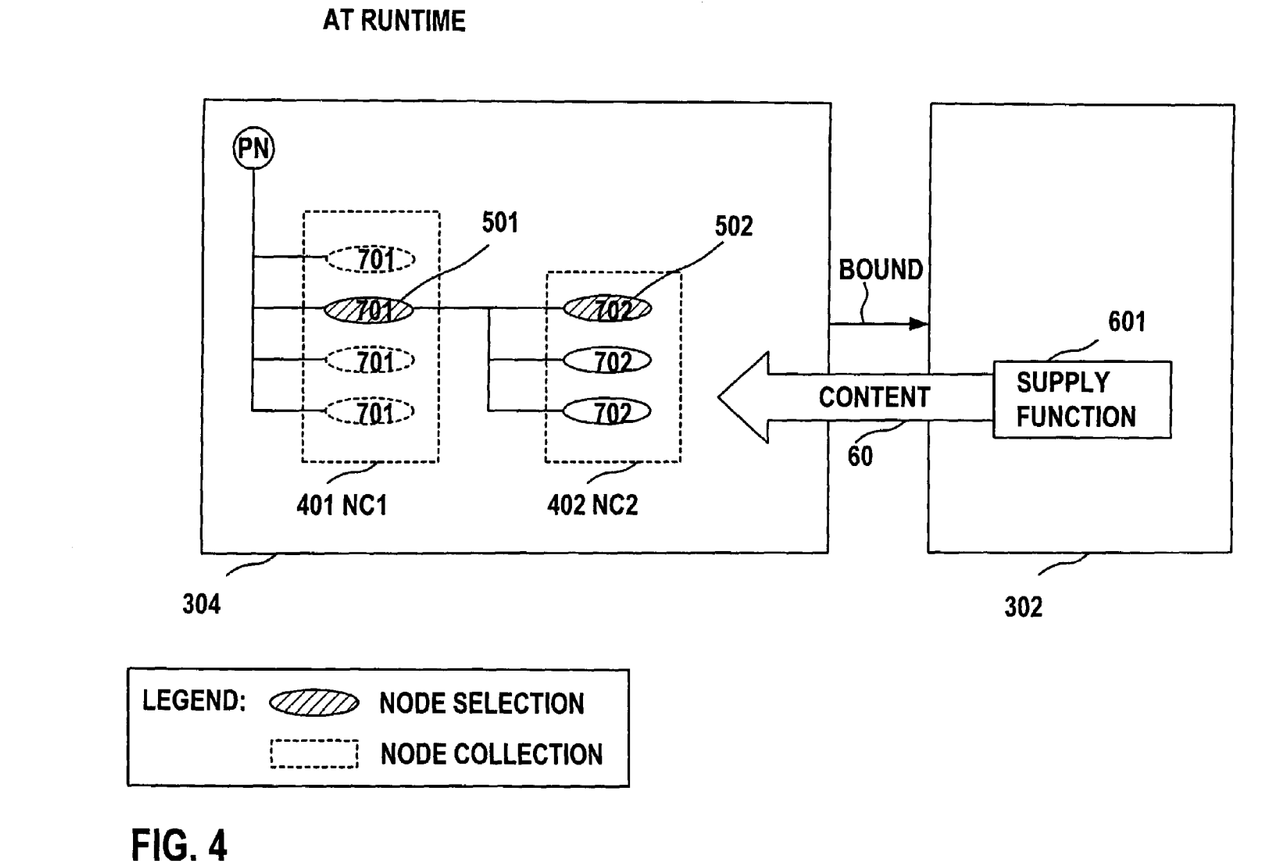
FIG. 4 illustrates an example of a node selection within the context at runtime.

FIG. 4 illustrates an example of a node selection 501 within the context 304 at runtime. A node PN can maintain a node selection 501 within a node collection 401. Node selections are illustrated in FIG. 4 by a grid pattern for each element of the node collection that belongs to the node selection. The node selection 501 is a designated subset (one or more elements) of the node collection 401 of the node PN. The node selection 501 has a cardinality that is controlled by the cardinality of the selected nodes declared at design time (see table 3, below). One specific element that plays a special role amongst the elements of the node selection will be referred to as the lead selection element.

For example, if the node PN corresponds to a specific customer, the first node collection 401 can include all orders of the customer. The lead selection of the node collection can be by default the first order of the customer. In this case, the second node collection 402 can include all order items of the selected order.

TABLE 3

Examples of the cardinality of a node selection in dependence of the node (collection) cardinalities of the corresponding node elements of the selection

| Value | Meaning | Node Cardinality |
| --- | --- | --- |
| 0 . . . 1 | single selection (≅ lead selection), can be empty | Any |
| 1 . . . 1 | single selection (≅ lead selection), always contains one element | only 1 . . . 1, 1 . . . n |
| 0 . . . n | multiple selection; can be empty; if not empty one element is designated as the "lead selection" | only 0 . . . n, 1 . . . n |
| 1 . . . n | multiple selection. One selected element is designated as the "lead selection" | only 1 . . . n |

If the node selection is not empty at runtime, one of the elements of the node selection is designated as the lead selection element. The lead selection element can be accessed from controller code. UI elements can be bound against the attributes of the lead selection element and the content of a child node depends on the lead selection element of its parent node. For example, the node selection 501 can correspond to a selection that results from an user action (e.g., the user selects the second order out of a list of orders.) This automatically triggers an update of the second node collection 402 with, for example, all order items of the second order. The second node collection 402 can have a further node selection 502. A node selection can also include multiple elements of the corresponding node collection.

Node selection and lead selection element are bindable node properties in the sense that UI elements can represent a node selection (e.g., as selected lines in a table control) and also modify it (e.g., selecting/deselecting an item in a table control adds/removes the corresponding element to/from the node selection). Node selections can exist on their own. A selection made by a user can be represented as a node selection and a node selection can be visualized in a UI element.

A context can include a flat set of child nodes (independent nodes) each one independent from the others. Each independent node can have further child nodes (dependent nodes). While the content of independent nodes can be defined by the application, the content of a dependent node depends on the lead selection element of its parent node. The application defines how the content of the dependent node depends on the parent node's lead selection element by specifying a corresponding supply function. For example, a supply function can be used in case a specific order (e.g., node selection 501) of a customer is selected and only order items that are not on stock should be included in the second node collection 402. In other words, the relationships between data that are declared in the context 304 at design time can be used to filter data at runtime.

For example, the supply function can be defined in such a way that it always returns the same value for the same selected node element and does not take into account changes in the returned data. In other words, the application runtime can decide not to call a supply function again with the same arguments when it is called a second time within the lifetime of the application.

For example, when a parent node (e.g., an order) is bound to a new node collection, the content of all of its child nodes (e.g., order items) becomes "invalid". When a node is accessed and its content (node collection) is "invalid", its content is determined again, for example, by calling a corresponding supply function 601 to supply content for the node.

Supply functions can be declared as methods in the corresponding controller 302. The following pseudo code shows an example of the signature of a supply function:

Collection supplyFunction(Node node, NodeElement parentElement);

When the application is generated, program code is generated that calls the declared method when content for a node is to be supplied 60.

Embodiments of a supply function can have one or more of the following features:
Node elements included in a returned node collection match the type of the corresponding node (e.g., a node element created from the node or from a mapped node or from a corresponding model class, if the node is a model node)
The supply function returns enough data to match the declared cardinality of the node.
The returned node collection depends on parameters of the supply function. The supply function is called a second time within the lifetime of an application when at least one of the parameters is changed.
The supply function can also be loaded on demand by the application.

Figure 5A:
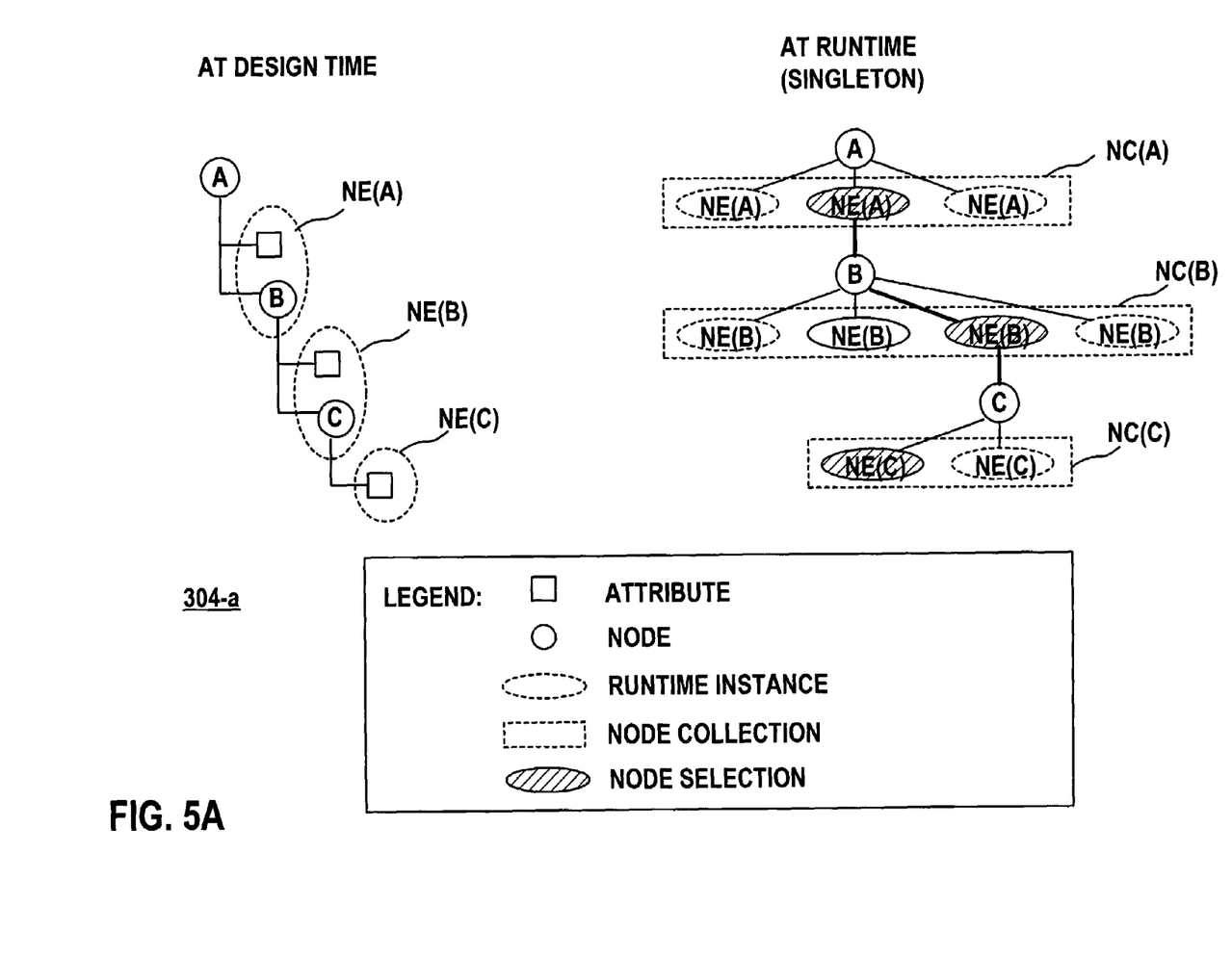
FIGS. 5A and 5B illustrate two alternative runtime implementations of context data instances.
Figure 5B:
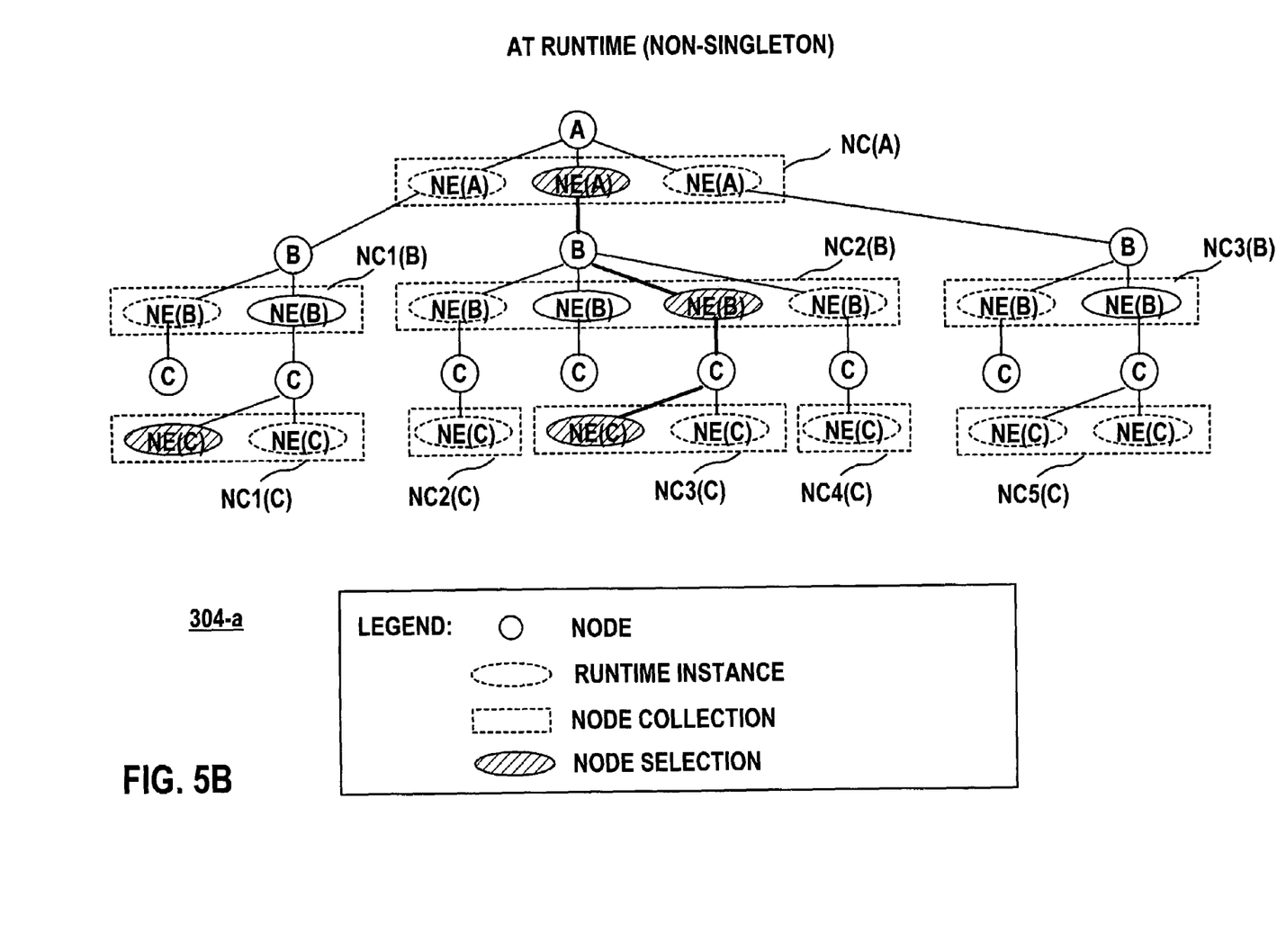

FIGS. 5A and 5B illustrate two alternative runtime implementations of context node data instances of a context 304-a. In a first implementation (see FIG. 5A), a dependent node (e.g., node B) can be represented as a single node instance whose node collection changes whenever the parent node's (e.g., node A) node collection or lead selection element changes. For example, for a single node instance, content (node collection) can be maintained for the current lead selection of the parent node only. This reduces the amount of used system resources, such as main memory, and it enables static binding. Static binding means that the node binds to a "class" of the node instead of binding to a named node instance. A node according to the first implementation will be referred to as a singleton node.

FIG. 5A shows an example of a context structure of context 304-a at design time. Node A has a node element NE(A), node B has a node element NE(B) and node C has a node element NE(C), wherein each element includes child nodes and/or attributes. At runtime, in case of a singleton node implementation, a node collection NC(B) of node element NE(B) instances is only maintained for the lead selection of the node collection NC(A). Further, a node collection NC(C) of node element NE(C) instances is only maintained for the lead selection of the node collection NC(B).

In a second implementation (see FIG. 5B) a single node instance of the node (e.g., node B) exists for each instance in the parent node collection (e.g., node collection NC(A)). All single node instances can be accessed directly. For example, a runtime implementation can create and fill single node instances by loading data on demand to reduce resource usage. In the second implementation an application can also access data of child nodes that do not correspond to the parent node's lead selection element (e.g., read address fields for business partner No. 5 instead of the address fields for the currently selected business partner No. 3). A dependent node according to the second implementation will be referred to as a non-singleton node.

FIG. 5B is based on the context structure 304-a at design time as described in reference to FIG. 5A. It shows an example of a runtime structure of context 304-a according to the second implementation. Each instance in node collection NC(A) can have a node collection NC1(B) to NC3(B). Further, each instance of node collections NC1(B) to NC3(B) can have a node collection NC1(C) to NC5(C). Empty node collections are not shown in the example.

Information identifying a node as a singleton or non-singleton node can be stored in a node property "singleton" (see table 4, below). If a non-singleton node acts as the parent node of a singleton node, the singleton node is not a singleton node with regards to the context. That is, for each instance of the non-singleton parent node there exists one instance of the singleton child node. If the child node is a singleton node with regards to the context, then its parent node may change depending on its grandparent node's lead selection element.

The context keeps references to all created instances of a child node until the parent node's collection changes. This enables a client in a client-server system to remember data from previously received child node instances and modify this data later. The server keeps this data and has, at all times, a consistent picture of which data is in the current context (=context of the current view).

TABLE 4 node property singleton

| Value | Meaning |
| --- | --- |
| True | a single instance of the node exists per parent node and the content of the node changes when the parent node's lead selection element changes. |
| False | one instance of the node exists per node element in the parent node's node collection. The content of an instance does not change. |

All instances of a child node can be accessed through a typed context application programming interface (API).

If the parent node is a singleton node, only a single instance exists and can be accessed and its content depends on the parent node's node collection and lead selection element. For example, at design time, a tree structure is declared including an independent node "Customers" that has a child node "Orders" and the child node "Orders" has a further child node "OrderItems". Each customer can have multiple orders and each order can have multiple items. This is reflected in a corresponding context by declaring child nodes belonging to each element of the parent node so that each element has a collection of its own.

Figure 6:
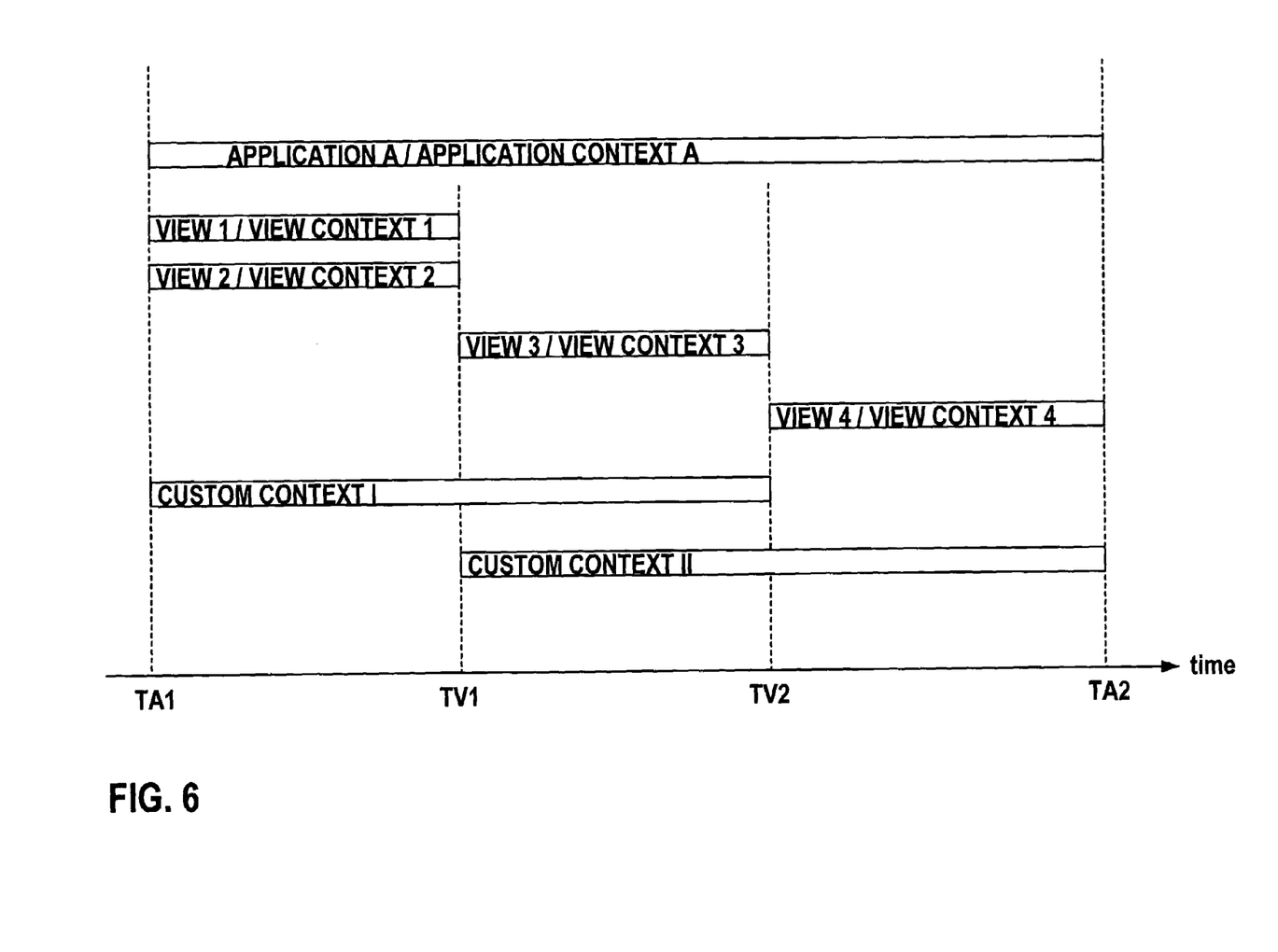
FIG. 6 illustrates an example of context lifetimes for various context types.

FIG. 6 illustrates an example of context lifetimes for various context types.

There are at least two types of controllers and correspondingly two types of contexts: view controllers/view contexts and custom controllers/custom contexts.

A view controller relates to a corresponding view. The lifetime of the view controller equals the lifetime of the corresponding view, that is, the time the view is displayed. A view context relates to the view controller and has the same lifetime. UI elements of the view can bind to the view context. When executing an application (e.g., APPLICATION A). that is built according to the extended MVC design pattern, typically a sequence of multiple views (e.g., VIEW 1, VIEW 2, VIEW 3, VIEW 4) is presented to a user. The user interacts with the application program through the various views. The various views can raise events that cause the related view controllers to determine which view is presented when and where. That is, some views and, therefore, the related view contexts can have a short lifetime.

In the example of FIG. 6, APPLICATION A starts at TA1 and ends at TA2. When the application starts, VIEW 1 and VIEW 2 are presented to the user simultaneously. At TV1, the corresponding view controllers determine that the presentation of VIEW 1 and VIEW 2 needs to be replaced by a presentation of VIEW 3. At TV2, the corresponding view controllers determine that the presentation of VIEW 3 needs to be replaced by a presentation of VIEW 4. The views VIEW 1 to VIEW 4 relate to the view contexts VIEW CONTEXT 1 to VIEW CONTEXT 4. That is, the data that is stored in each view context has the same lifetime as the view that binds to the data.

Some data need to be stored over the lifetime of multiple views. For this purpose, a custom context can be defined. A custom context relates to a custom controller of the model. For example, a custom controller is implemented as view independent, application process oriented coding. The lifetime of a custom context can be defined in such a way that it spans the lifetime of multiple views.

In the example of FIG. 6, CUSTOM CONTEXT I is defined to span the lifetime of the views VIEW 1 to VIEW 3. CUSTOM CONTEXT II is defined to span the lifetime of the views VIEW 3 and VIEW 4.

A specific example of a custom context is an application context, which persists over the lifetime of the application, that is, over the sequence of all views of the application. However, in the case of a custom context, the application specifies its lifetime, whereas in the case of an application context, the system specifies the lifetime of the application context because the system knows when an application starts (TA1) and when it ends (TA2). Therefore, the system can control an application controller that is assigned to the application context.

Figure 7:
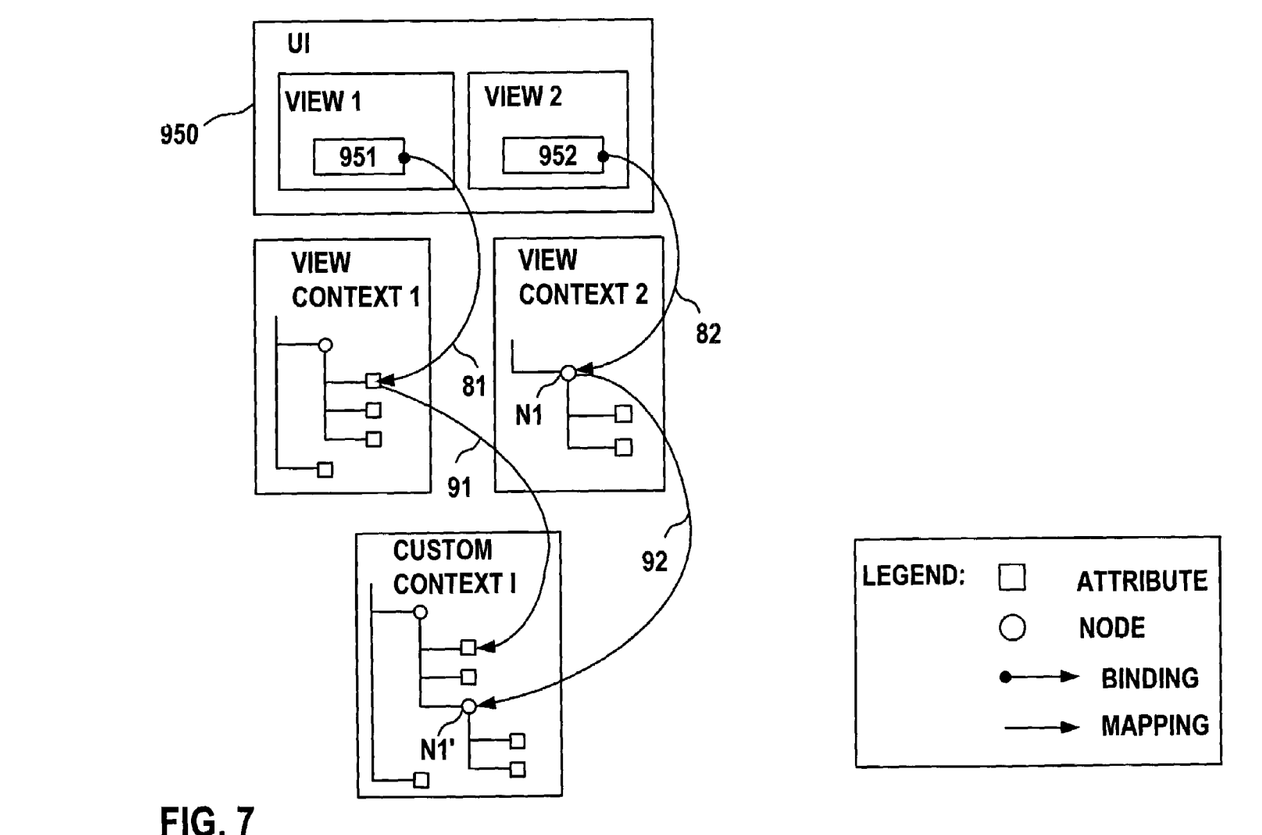
FIG. 7 illustrates mapping of contexts according to the present invention.

FIG. 7 illustrates mapping of contexts according to the present invention.

Because UI elements (e.g., UI elements 951, 952) of views (e.g., VIEW 1, VIEW 2) that are used in a user interface (UI) 950 bind 81, 82 to view contexts (e.g., VIEW CONTEXT 1, VIEW CONTEXT 2) and long persisting data can reside in custom contexts (e.g., CUSTOM CONTEXT I), an embodiment of the present invention enables mapping 91, 92 of nodes/attributes of view contexts or custom contexts to nodes/attributes of custom contexts. In other words, nodes and attributes of view contexts or custom contexts can reference type-compatible nodes and attributes in other custom contexts. Nodes can also be mapped to other nodes within the same context. Node mapping reduces the need for copying data between several contexts by enabling a node N1 of a first context (e.g., a view context, such as VIEW CONTEXT 2, or a custom context) to reference 91 a node N1' of a second context (e.g., a custom context, such as CUSTOM CONTEXT I, or an application context), where the node N1' of the second context has or references the data. The same is true for attributes.

Therefore, the data can be manipulated in a custom/application context and each view context that references the custom/application context provides its view with the current data stored in the custom/application context. Mapping contexts can span multiple context levels. That is, a custom context can reference a further custom context. Therefore, context hierarchies can be created (see FIG. 7).

For example, related data can be collected in a dedicated custom context. The binding to this data is implemented by using a view context that is mapped to the custom context accordingly.

The extended MVC pattern enables an application developer to quickly modify an application while maintaining consistency of the application. For example, in some cases rearrangement of views or UI elements can be achieved without modifying the corresponding controller code. This provides a way for an application developer to better structure applications in light of potential functional enhancements or changes. For example, reusing a field that already exists on one view in other views can be achieved by defining the corresponding mapping while the corresponding controller code stays valid.

The following examples explain various features of context mapping that can be implemented with the present invention.

FIRST EXAMPLE

If a node M ("Mapped Node") is mapped to a node O ("Origin Node"), node M maps its node collection to node O's node collection. The node selections of nodes M and O can be mapped. Node M can also maintain its own node selection on node O's node collection.

For example, the node collection cardinality of node M equals that of node O (e.g., by inheritance).

The selection cardinality can be inherited from origin node O. Node M can override the node cardinality inherited from node O.

If node O is a singleton node, node M is a singleton node, too. If node O is a non-singleton node, node M can be a singleton or non-singleton node. If node M is a non-singleton node it shares the same parent node collection with node O. If node M is a singleton node, then the collection of node M follows the instance of node O that belongs to the lead selection of node O's parent node.

For mapped nodes, the content of the node collection can be defined by the node collection of the origin node.

SECOND EXAMPLE

An independent node can always be mapped. It can be mapped to any other node in the same context or to any other node in another custom context (as long as no cycle is formed with regards to parent-child and mapping relationships).

A child node of a mapped node can be unmapped. In this case its content can be determined by the supply function mechanism.

When a parent node is mapped to a further parent node, a child node of the parent node can be mapped to a further child node of the further parent node. In other words, if node W is a child of node X and node Y is a child of node Z, node W can be mapped to node Y if node X is mapped to node Z.

If a child node of a mapped node is mapped to a further child node of the corresponding origin node, then either the mapped node maps to the node selection of the origin node or the origin node is a non-singleton node. This avoids a conflict between the dependencies implied by the parent/child relationship and the mapping relationship that results from mapping a selection of a child node of an unmapped node.

Figure 8:
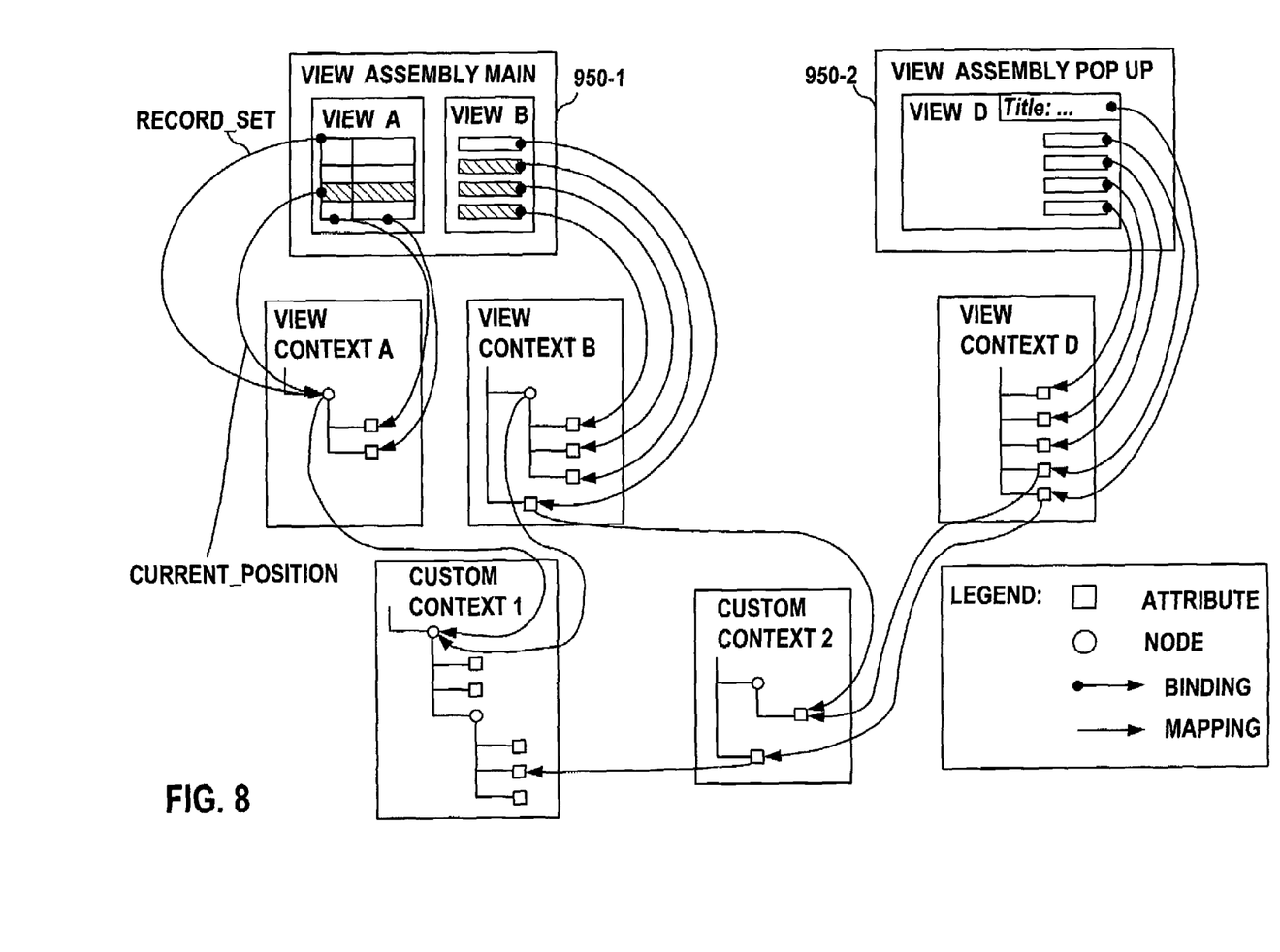
FIG. 8 illustrates a specific example of mapping contexts.

FIG. 8 illustrates a third, specific example of mapping contexts.

Two windows 950-1, 950-2 can be displayed at runtime on a client of a client-server system. For example, the windows are part of a user interface of an application and are displayed on a conventional display device (e.g., monitor) of the client. A page that is displayed may include one or more view assemblies.

The first window 950-1 displays view assembly MAIN that includes view A and view B. The second window displays view assembly POP UP that includes view D. The following description refers to definitions and declarations at design time. The views in the view assemblies include UI elements which are bound to the view contexts of the corresponding views. The binding is illustrated by bended arrows with a bullet point at the origin of the arrows. UI elements of views A, B, D are bound to view contexts A, B, D, respectively. The UI element in view A is a table having two columns. The four UI elements of view B can be display/input fields that have a relationship to the table of view A. The UI elements of view D correspond to a title of the pop up and four further input/display fields.

The view contexts A, B, D include node/attribute hierarchies for maintaining the data of the corresponding view. Nodes and attributes can derive their state from nodes/attributes of custom contexts (e.g., custom contexts 1, 2) that belong to controllers (e.g., custom or application controllers) other than the corresponding view controllers. This enables maintenance of the data without redundancies. Further, it can be used for a method for synchronizing data dependencies amongst multiple views.

In the example of FIG. 8, view context A and view context B include one independent node each, which is illustrated as the top-level node of the corresponding context structure. The independent node of view A holds information about which record set is to be used for the table and about the current position within the record set. Both independent nodes are mapped to the corresponding independent node in custom context 1. This means that view A and view B share a common data source (e.g., the record set) provided by the commonly used node of custom context 1. Therefore, the record set displayed in the table of view A is also used as the underlying record set for view B. View A displays two columns of the record set, whereas view B displays three fields of a selected row of the record set. This is represented by the UI elements illustrated by a grid pattern. The three fields in view B can also serve as input fields to update the underlying record set. View B displays a further field not related to the record set.

The declaration of data relationships through contexts leads to redundancy free data transport from the server to the client and allows the application to synchronize the table of view A with the input in view B. It also allows an application developer to use the current selection in a custom controller without needing to know how the selection was made (e.g., by using a table view UI element, or a dropdown list UI element or any other UI Element able to make a selection in a list). This decreases the dependency of application logic from presentation logic.

Context mapping can also be used to open a menu/list (e.g., view D in the view assembly POP UP), which can display data based on the current selection. No transport code is necessary and no selection parameters need to be passed.

In the example of FIG. 8, the last two attributes of view context D are mapped to corresponding attributes of custom context 2. Because the last attribute of view context B maps to the same attribute of custom context 2 as the next to last attribute of view context D, the content of the upper input/display field in view B equals the content of the upper input/display field in view D. No transport code for transporting data from view B to view D is necessary to achieve this.

The last attribute of view context D is mapped to the last attribute of custom context 2 which again is mapped to the next to last attribute of custom context 1. This illustrates that multi-level context hierarchies can be built. Multi-level context hierarchies are useful to package data according to their lifetime because, as explained in reference to FIG. 6, each context can have a different lifetime. Storing data only once in the context hierarchy and using mapping to access the data through multiple levels of the context hierarchy avoids redundant storage of data and, therefore, reduces main memory consumption.

The invention can be implemented in digital circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims.

The invention claimed is:

1. A computer-readable storage device containing instructions executable by one or more processors for controlling a data processing system to perform a method for supplying data to a view presenting a model, the view having at least one user interface (UI) element and relating to a controller for manipulating the model, the method comprising:
creating a run-time context data structure, the run-time context data structure being based on a design-time context data structure, the design-time context data structure including a context structure element that is bound to the UI element;
storing the run-time context data structure that is based on the design-time context data structure in a storage area that relates to the controller;
using a supply function to provide content for the run-time context data structure;
accessing a structure element of the run-time context data structure, the context structure element comprising a node collection;
evaluating the node collection;
if the result of evaluating the node collection requires filling at least one element of the node collection:
sending a query to a computer system; and
in response to the query, receiving from the computer system at least one data instance that is used to fill the at least one element of the node collection.

2. A computer-readable storage device containing instructions executable by one or more processors for controlling a data processing system to perform a method for accessing application data by an application using a model of the application and at least one controller for manipulating the model, the method comprising:
providing a storage area, the storage area being organized according to a design-time context data structure having declared relationships between the application data, the design-time context data structure relating to the controller;
storing a run-time context data structure that is based on the design-time context data structure;
accessing a structure element of the run-time context data structure, the context structure element comprising a node collection;
evaluating the node collection;
if the result of evaluating the node collection requires filling at least one element of the node collection:
sending a query to a computer system; and
in response to the query, receiving from the computer system at least one data instance that is used to fill the at least one element of the node collection.

3. A computer-readable storage device containing instructions executable by one or more processors for controlling a data processing system to perform a method, the method comprising:
establishing a model, the model implementing application logic of an application;
establishing at least one view for presenting the model, the view comprising a user interface (UI) element which is bound to a first context data structure;
establishing at least one controller for manipulating the model, the at least one controller relating to the at least one view;
establishing at least one storage area for storing an instance of the first context data structure, the instance of the first context data structure comprising data having been stored in the storage area by an access method associated with the at least one controller, the first context data structure having been declared prior to execution of the application, the first context data structure relating to the at least one controller;
storing the run-time context data structure that is based on a design-time context data structure in a storage area that relates to the controller;
accessing a structure element of the run-time context data structure, the context structure element comprising a node collection;
evaluating the node collection,
if the result of evaluating the node collection requires filling at least one element of the node collection:
sending a query to a computer system; and
in response to the query, receiving from the computer system at least one data instance that is used to fill the at least one element of the node collection.

4. The computer-readable storage device of claim 3, wherein the instance of the first context data structure comprises one or more node elements, each node element comprising one or more data fields based on the first context data structure.

5. The computer-readable storage device of claim 4, wherein one or more of the node elements are grouped into a node collection.

6. The computer-readable storage device of claim 5, wherein one or more of the node elements in the node collection are grouped into a node selection.

7. The computer-readable storage device of claim 6, wherein one of the node elements in the node selection is identified as a lead selection element.

8. The computer-readable storage device of claim 7, wherein the UI element displays data from the lead selection element.

9. The computer-readable storage device of claim 3, wherein the access method is part of an application programming interface (API) for accessing the instance of the first context data structure.

10. The computer-readable storage device of claim 3, wherein the method further comprises:
   establishing an instance of a second context data structure, the second context data structure having been declared to be a child of the first context data structure prior to execution of the application.

11. The computer-readable storage device of claim 10, wherein the instance of the first context data structure comprises one or more node elements of a first type grouped into a first node collection, and the instance of the second context data structure comprises one or more node elements of a second type grouped into a second node collection.

12. The computer-readable storage device of claim 11, wherein one of the node elements in the first node collection is identified as a selected element, and wherein the node elements in the second node collection depend on the selected element.

13. The computer-readable storage device of claim 11, wherein the second node collection has a state.

14. The computer-readable storage device of claim 13, wherein the state is selected from the group of valid, invalid, and unfilled.

15. The computer-readable storage device of claim 14, wherein the method further comprises:
   establishing a supply function for determining a content of the one or more node elements in the second node collection if the state of the second node collection is invalid or unfilled.

16. The computer-readable storage device of claim 15, wherein the supply function is implemented as a method of the at least one controller.

* * * * *

UNITED STATES PATENT AND TRADEMARK OFFICE
CERTIFICATE OF CORRECTION

| | |
|---|---|
| PATENT NO. | : 7,600,215 B2 |
| APPLICATION NO. | : 10/676837 |
| DATED | : October 6, 2009 |
| INVENTOR(S) | : Cherdron et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this

Fifth Day of October, 2010

David J. Kappos
*Director of the United States Patent and Trademark Office*